Oct. 23, 1956     J. BJORKSTEN     2,767,501
FISHING DEVICE
Filed March 5, 1951     4 Sheets-Sheet 2
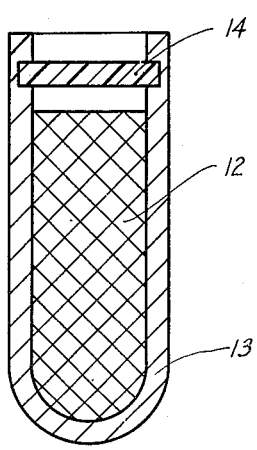
Fig. 2
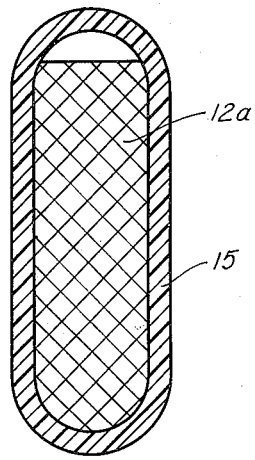
Fig. 3
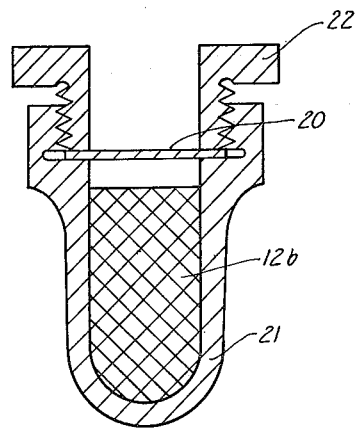
Fig. 4
JOHAN BJORKSTEN
      INVENTOR.
BY 
      AGENT Oct. 23, 1956    J. BJORKSTEN    2,767,501
FISHING DEVICE Filed March 5, 1951    4 Sheets—Sheet 4

INVENTOR.
JOHAN BJORKSTEN
BY
*attorney*

United States Patent Office 2,767,501
Patented Oct. 23, 1956

2,767,501

FISHING DEVICE

Johan Bjorksten, Madison, Wis.

Application March 5, 1951, Serial No. 213,992

3 Claims. (Cl. 43—7)

This invention relates to deep sea fishing, and specifically to fishing at depths so great that it is impractical to employ ropes or lines.

From sounding and submarine detection work, it is known that at depths of about 6,000 to 7,000 feet in the Pacific Ocean there is a disturbance, which can only be explained as due to very large quantities of living organisms. It is reasonable to assume that these might be organisms of a size and nature adapted either for human nutrition or human industry; however, it has not been possible to make any direct investigation, or to capture any such organisms, because it would be impractical to handle the length of rope or line required to carry any substantial fish trapping device to that depth and up, and any hook-type device would be pointless because any organism captured would be eaten by other carnivorous fish or organisms long before it had time to traverse the several thousand feet of water separating it from the surface.

An object of this invention is a net device which will sink to the depth indicated and then rise rapidly by its own buoyancy and without any strings or lines, in such a manner as to capture organisms of the great depths and carry them up to the surface.

Another object of the invention is a new fishing utensil.

Another object is a new fishing method.

Further objects will become apparent as the following detailed description proceeds.

In accordance with my invention, I employ an empty but inflatable balloon structure adapted to be filled with hydrogen from a source such as the reaction of lithium hydride with water or from a container of compressed hydrogen adapted to release hydrogen into the balloon. The hydrogen-supplying device may be adapted to operate in response to a given pressure, or in an alternate modification of the invention, after a given time, or in accordance with still another alternate, upon a given submarine signal. Attached to this buoyancy device is a trapping device which may consist of a net structure, which will rise rapidly as the balloon becomes inflated and in this rising motion will trap any organisms in its path and carry them to the surface.

Specific embodiments are shown in the attached drawings.

Figure 1:
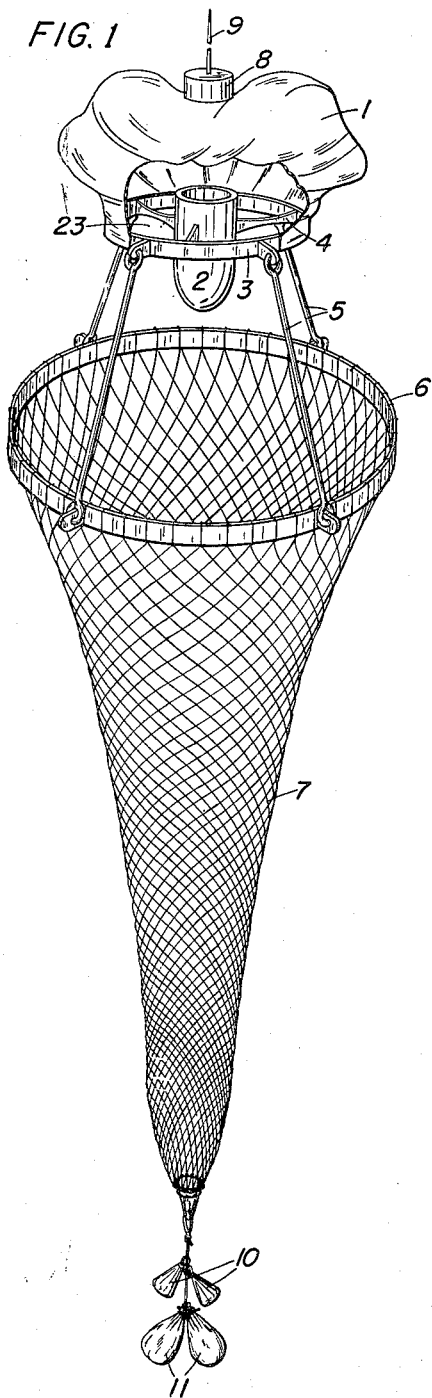
Figure 5:
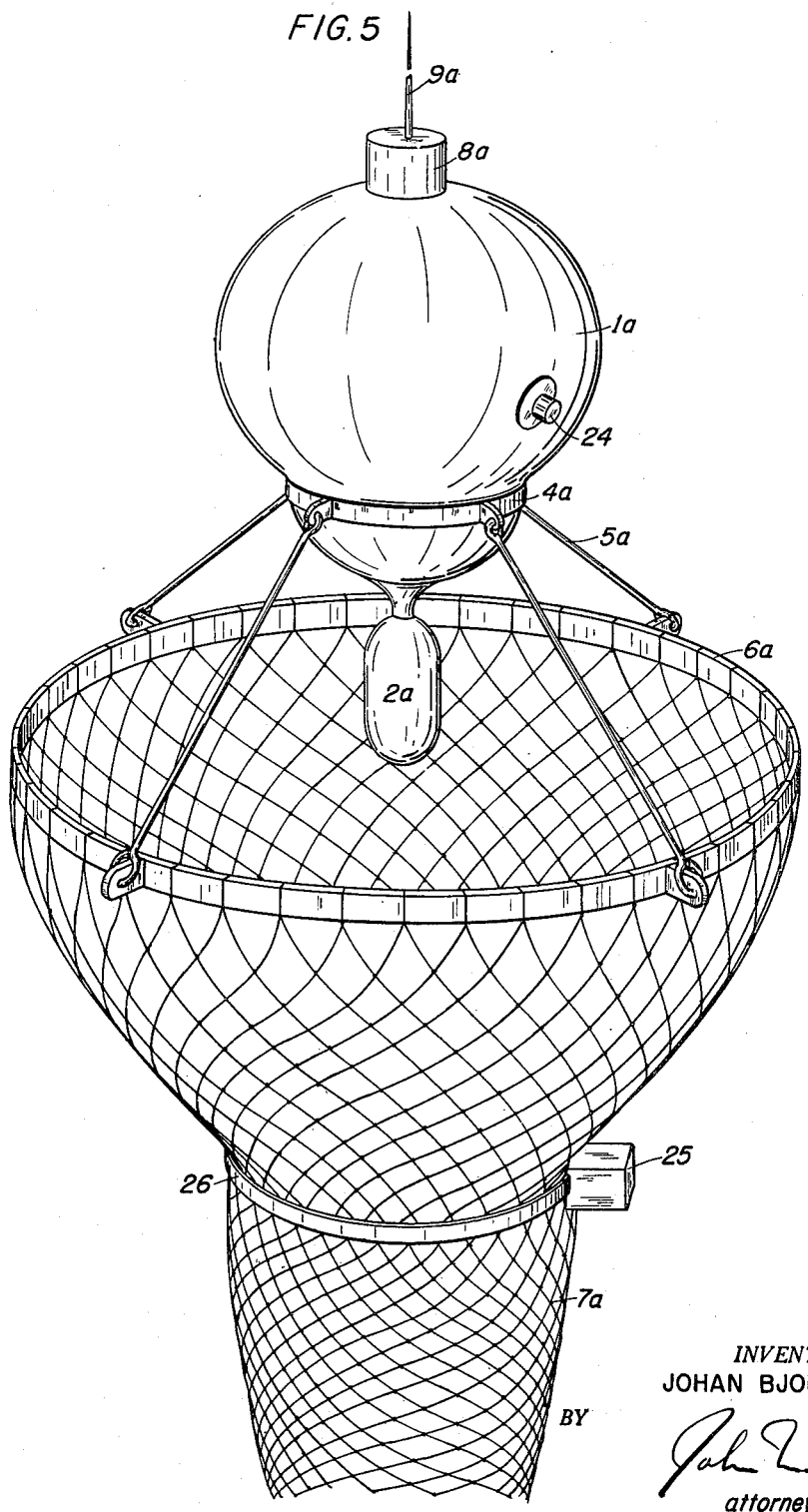
Figure 6:
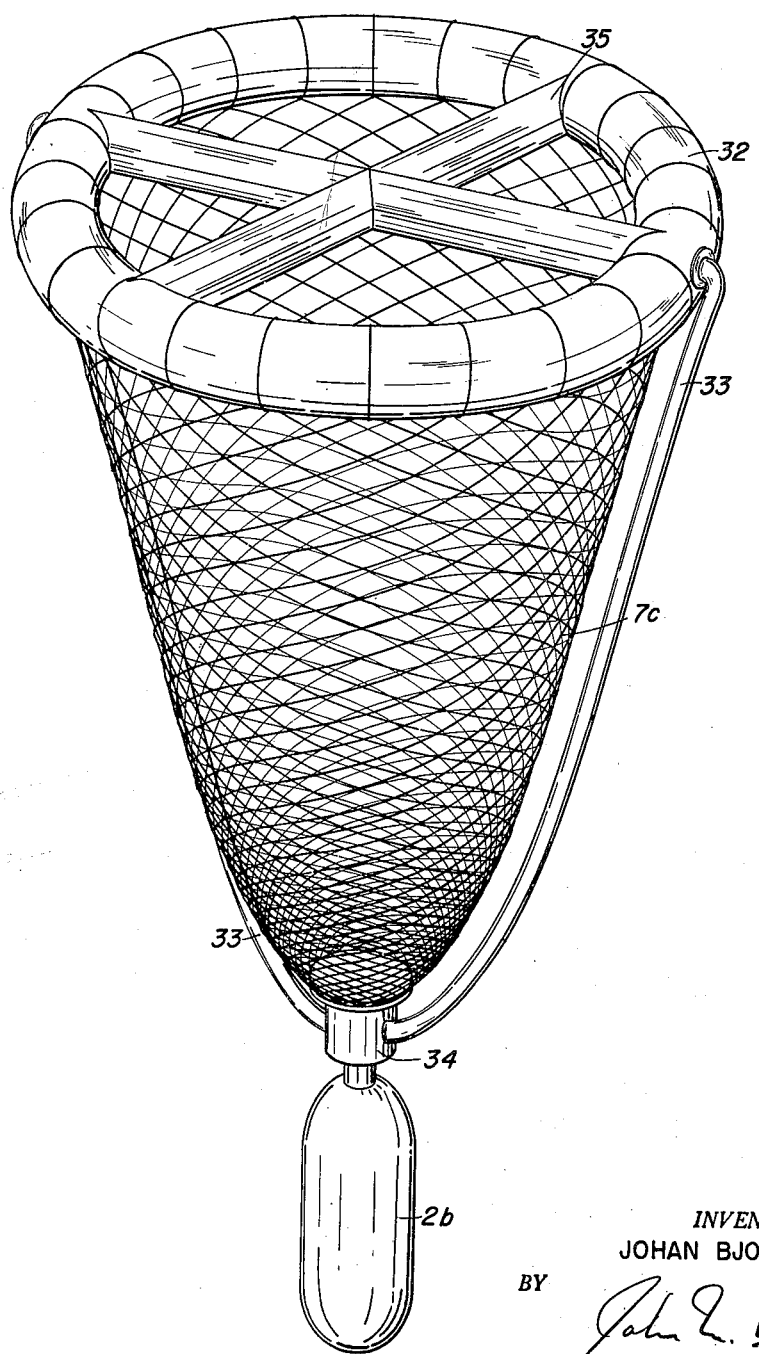

Figure 1 is a partially cut away perspective view of the device of my invention. Figures 2 and 3 are cross-sectional elevation views of embodiments of one part of the device; Figure 4 a cross-sectional elevation of other embodiments of the same part. Figure 5 is a perspective view of another embodiment of the device. Figure 6 is a perspective view of an embodiment of the device in which the balloon has an annular or "doughnut" form.

In Figure 1, reference numeral 1 represents a non-inflated balloon in a collapsed condition. A hydrogen supplying device 2 is positioned in the center of ring 3 by supporting members 4. Collapsed balloon 1 is firmly attached to ring 3 in such a manner that gas evolved by device 2 will be released into the balloon so as to fill the balloon. From ring 3 strong connecting members 5 hold a strong metal ring 6 to which is attached a net 7.

At the top of the balloon there is a radiosonde device 8 and an aerial 9 which will broadcast the position of the balloon when it reaches the surface, to facilitate determining the location of the device and recovering it. Alternatively, a device may be provided for spreading a bright dye on the surface of the water.

When the device is lowered or thrown into the water, it will sink under the weight of rings 3 and 6 and device 2. If necessary from the standpoint of equilibrium, weights 10 can be added. This added weight can also be of a water soluble substance such as salt, which could be placed in bags 11 and attached to net 7 so as to weigh the device down. The salt would dissolve and reduce the weight of the assembly after a certain time in the water, thus reducing its burden in its ascent.

In response to either a submarine signal, the lapse of time, or the attainment of a certain depth as represented by the corresponding pressure, hydrogen-supplying device 2 will operate and will fill the balloon with hydrogen. Helium or even air or nitrogen or any other gas might be used equally well in other embodiments. The inflation of the balloon will suddenly give the device a very great buoyancy. As a consequence, the apparatus will start rising and will rise rapidly, capturing any fish or deep sea denizen in its path.

Any of the means which are known to the prior art may be used for causing the release of hydrogen or other gas by device 2 in response to any of the above-listed stimuli.

An embodiment of a device for causing the release of hydrogen which is partially responsive to elapsed time and partially responsive to pressure is shown in Figure 2. Lithium hydride 12 is contained in capsule 13 which is tightly closed with a layer of water soluble material 14 such as, for example, polyvinyl alcohol. With the elapse of time, layer 14 dissolves in the water by which it is surrounded. Also, as the pressure increases with increasing depth, the layer 14, weakened by having partially dissolved, may be ruptured by the pressure. Regardless of whether final rupture of 14 is due to solution or pressure effects, water is admitted to the interior of capsule 13 and thereupon reacts violently with lithium hydride 12, producing large quantities of hydrogen. A similar embodiment which operates in an almost identical manner is shown in Figure 3. Rupture of the water soluble material 15 enclosing lithium hydride 12a allows hydrogen to be produced.

An embodiment which is responsive to pressure alone is shown in Figure 4. Frangible disk 20, which is of a known thickness, is held onto the seat in the opening of container 21 by nut 22. The thickness controls the pressure at which it will burst. The container 21 holds lithium hydride 12b. When disk 20 bursts inwardly due to the water pressure, hydrogen is produced by the reaction between water and lithium hydride.

Examples of other methods for causing the release of hydrogen or other gas include the following:

A. Responsive to elapsed time:
　1. Clockwork
　2. Acid, etching a corrodable material
　3. Fuse
B. Manometric, or responsive to pressure:
　1. Bourdon tube linkage
　2. Compressible wafer or bellows
C. Responsive to remote signal:
　1. Radio
　2. Sonic Other methods for providing gas to inflate the balloon include:

A. Chemical:
1. Reactions of rocket propellants, such as hydrogen peroxide and permanganate, nitric acid and aniline nitromethane
2. Reactions such as that of calcium carbide with water B. Physical
1. Heating solid carbon dioxide
2. Containers of gas under high pressure, released by a valve As the device ascends and the water pressure decreases, the hydrogen in the balloon will expand, as shown in Figure 5. Since the balloon is open at its lower extremity as shown at 23 in the embodiment of Figure 1 or is fitted with a pressure release valve 24 as shown in Figure 5, the excess hydrogen thus created can be released and escape. When a certain depth is reached in the upward travel of the device, a servomotor 25 (see Fig. 5) may be actuated which closes the upper part of the net in order to prevent the escape of the contents of the net. Servomotor 25 can be actuated in any of the ways provided for causing the actuation of gas releasing device 2. It is possible that for many organisms this may not be necessary, inasmuch as the deep sea denizens which are caught may be stunned or killed on ascent to lower pressures and thus unable to escape no matter whether or not the net is closed.

The net may be closed by causing loop 26 to close around the upper part of net 7a as shown in Figure 5 or it may be closed by any other means known to prior art. The precise form and dimensions of the device will be gauged by conditions of use and the size of the organisms it is desired to capture. For example, the ring 6 or 6a might be about 20 feet across in diameter and the balloon might have a content of about 1500 cubic feet and approximately 300 pounds of lithium hydride might be used to provide the buoyancy. However, these dimensions are wholly arbitrary and are not essential to the invention in any manner. Likewise, many of the elements may be duplicated, so that, for example, one balloon may pull up several nets connected to the balloon by strings of various size, and these nets also may have varying degrees of fineness. Also, several balloons may be employed to raise one single net. This may be a sound precaution to insure safe ascent of the device if for some reason one of the balloon devices should fail to function.

Furthermore, the connecting members 5 or 5a may be made very long, so that if the balloon in its ascent should scare away some of the organisms that it is desired to capture, there would be a sufficient lapse of time between the ascent of the balloon and the ascent of the net to permit the organisms to regain their composure and return to the spot, after the passage of the balloon, before the rim of the net enters the region.

Furthermore, it is possible, instead of a balloon of conventional form, to employ an annular type of device carrying a net, in which case it is advisable to provide fins to insure that the device rises with the net opening in a horizontal plane and not sidewise. This arrangement is shown in Figure 6. In this case, the gas container 32 has an annular form and is inflated by gas-producing device 2b. Device 2b is connected by means of tubing 33 to the gas container 32. Gas is produced by device 2b in any of the manners described above or known to the art and its operation is actuated by any of the means described above or known to the prior art, 34 representing the actuating device.

The device further comprises a fin assembly 35, the dual purpose of which is to make certain that the balloon does not collapse and to direct the direction of the ascent, so that the net opening is kept in a horizontal plane.

It is possible also to include means for jettisoning device 2b upon inflation of the balloon, so as to reduce the weight to be carried by the device in its ascent.

Obviously, the invention is capable of many modifications, and in the form depicted in Figure 6 it is possible to employ multiple gas bags to lift the frame structure holding the net.

Instead of using flexible balloons, which is the most convenient procedure from the standpoint of space and transportation, it is also possible to employ rigid metal net lifters, the principle and mode of operation, however, being unchanged.

It is thus seen that the invention is broad in scope, and is not to be restricted excepting by the claims, in which it is my intention to cover all novelties inherent in the invention as broadly as possible, in view of prior art.

Having thus disclosed my invention, I claim:

1. A deep fishing device comprising in combination a conical net, a metal head ring at the opening of the net to which one end of the net is secured, at least one heavy weight secured to the net at the bottom conical point thereof, a metal ring smaller than the aforementioned head ring and disposed thereabove and concentric therewith attached thereto with metal members adapted to support said head ring, a balloon attached to said smaller metal ring, said balloon being open at the bottom, and gas generating means provided with a gas outlet opening upwards approximately at the center of said smaller ring, said gas-generating means consisting essentially of a pressure-resistant vessel containing a substance adapted to undergo a gas-producing reaction when contacted with sea-water, sealed with a frangible disc adapted to burst at a predeterminable high pressure.

2. A fishing device comprising the combination of a conical net weighted at the apex thereof and a lifting device therefor attached thereto comprising an inflatable member, means for introducing gas into the interior of said inflatable member, sensing means adapted to respond to a predetermined condition of the ambient environment surrounding said device while submerged under water and in the absence of any signal transmitted thereto from any other controlling agency to thereby actuate said inflating means.

3. A fishing device comprising the combination of a conical net and a self-contained lifting device therefor attached thereto consisting of an inflatable member, inflating means for introducing gas into said inflatable member and sensing and activating means responsive to the static pressure of ambient surrounding liquid media arranged to cause said inflating means to operate in response only to a predetermined value of said pressure when submerged under water.

References Cited in the file of this patent

UNITED STATES PATENTS

| Number | Name | Date |
| --- | --- | --- |
| 262,235 | Lilliendahl | Aug. 8, 1882 |
| 528,350 | Trouve | Oct. 30, 1884 |
| 563,486 | Hibbert | July 7, 1896 |
| 1,035,560 | Erdmann | Aug. 13, 1912 |
| 1,144,499 | Owens et al. | June 29, 1915 |
| 1,490,157 | Cherniak | Apr. 15, 1924 |
| 1,898,899 | Rowley | Feb. 21, 1933 |
| 1,959,822 | Greve | Jan. 4, 1929 |
| 2,470,783 | Mead | May 24, 1949 |
| 2,549,475 | Jordim | Apr. 17, 1951 |

FOREIGN PATENTS

| Number | Country | Date |
| --- | --- | --- |
| 197,566 | Germany | Apr. 22, 1908 |